Figure 1:
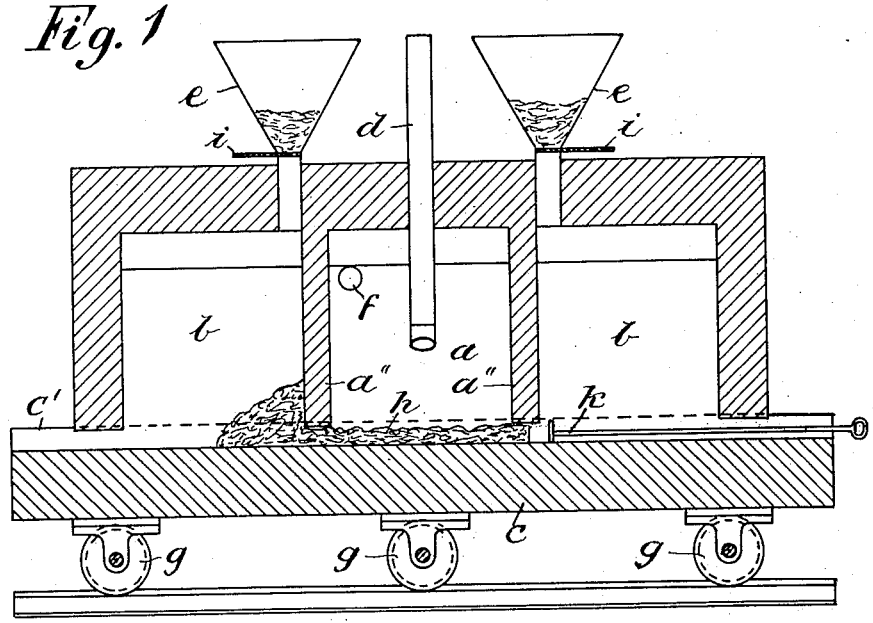

F. THARALDSEN.
PROCESS AND APPARATUS FOR PRODUCING ZINC AND THE LIKE.
APPLICATION FILED AUG. 18, 1916.

1,255,066.

Patented Jan. 29, 1918.

Inventor:
Filip Tharaldsen.
By:
B. Singer,
Atty.

UNITED STATES PATENT OFFICE.

FILIP THARALDSEN, OF CHRISTIANIA, NORWAY.

PROCESS AND APPARATUS FOR PRODUCING ZINC AND THE LIKE.

1,255,066.

Specification of Letters Patent.

Patented Jan. 29, 1918.

Application filed August 18, 1916. Serial No. 115,605.

*To all whom it may concern:*

Be it known that I, FILIP THARALDSEN, a subject of the King of Norway, residing at Christiania, Norway, have invented certain new and useful Improvements in Process and Apparatus for Producing Zinc and the like, of which the following is a specification.

The object of this invention is an improved process or method of production of zinc and other volatile metals in electric furnaces working with an electric arc or arcs for extraction of metal from ore.

The extraction of zinc and other volatile metals in electric furnaces has proved a rather difficult process in several respects. A principal difficulty is to be found in the circumstance that the temperature of reduction of the zinc is higher than its temperature of evaporation at atmospheric pressure. The metallic zinc is so to speak "born" in the shape of gas.

While other products which are produced in electric melting-furnaces are produced by reduction or reaction or both almost through the entire charge and can then be collected in liquid condition and tapped off at the bottom of the crucible, in the case of zinc extraction the charge has to be carried out in the manner that the zinc fumes or vapors can easily escape without collecting in the cavities of the charge and cause explosions or irregular escape.

The latter circumstance also causes inconveniences in the condenser, which cannot be constructed for irregular production without risking that a portion of the zinc would be transformed from gas directly into solid metal, whereby a powder is obtained which has to be subjected to renewed treatment.

Several processes have been tried to overcome said inconveniences, for instance, by letting the charge be introduced continuously so as to form a heap. The object of this arrangement would be to have the reduction take place mainly on the surface, whereupon the remaining slag could slide down the slope and expose or uncover fresh charge so that the process in this way would be continuous.

It has also been proposed to arrange the furnace rotating so that the charge could be moved constantly.

The first named of said processes has the inconvenience that the reduction and melting of the slag does not take place over the whole surface so evenly as intended. The part of the surface next to the heating source is subjected to a more intense heat than the rest of said surface, whereby an increasing cavity is formed and finally a falling down with consequent explosion would take place.

The last named method with rotary furnace has proved unsuitable as during the rotation dust is raised in the furnace which partly goes with the fumes to the condenser and partly causes the direct creation of powder.

The present invention relates to a process or method whereby said inconveniences are done away with, the material being introduced into the furnace in a uniform not too thick horizontal layer on the furnace bottom, said layer being subjected to heat by radiation from the source of heat. The zinc is thus reduced principally from the surface of said horizontal layer and the slag and also other residues remain on the furnace bottom from which they can be removed.

With this and other objects in view I construct my furnace with a movable bottom and combine the reduction chamber with two antechambers, one at each end, the one chamber for charging and the second for slagging alternately.

Figure 2:
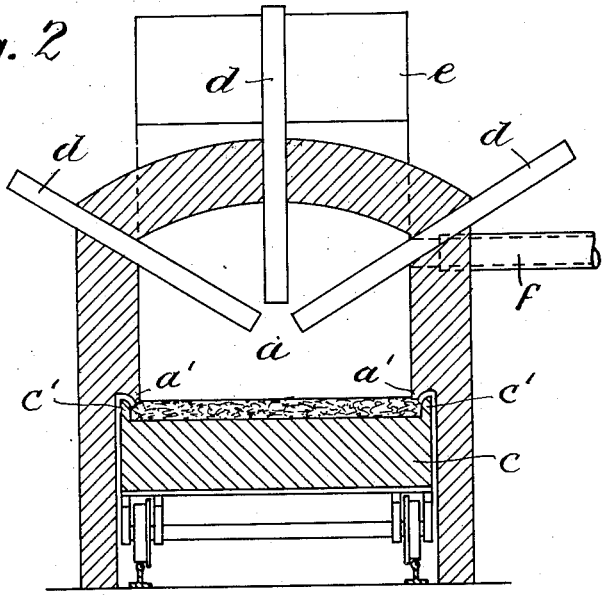

For the sake of illustration I show on the accompanying drawing a simple construction of furnace according to my invention. Figure 1 is longitudinal section and Fig. 2 transverse section of the furnace through the reduction chamber.

The furnace has a reduction chamber $a$ and on each side of the latter an antechamber $b$, $b$. The bottom of the furnace is formed by a table $c$ mounted on wheels $g$ running on a track through the whole length of the furnace. The furnace is provided with apertures for the electrodes $d$, $d$, $d$, funnels $e$, $e$ for the charge and an outlet $f$ for the fumes. The funnels may be closed by a valve $i$. The table-bottom $c$ has side flanges or ribs $c'$ and the furnace walls have projections $a'$ which overlap said ribs $c'$ so as to form an air tight closure on the sides, the charge $h$ serving as packing material.

The working of the furnace is as follows.—

The antechamber $b$ to the left is charged with a suitable quantity of material, the table c is then moved to the right and the material is stricken off by the partition wall so as to present a horizontal surface to the arc in the reduction chamber a. The material arriving into the opposite chamber b (to the right) is then removed by the poker k, and fresh charge is introduced into this right chamber and the table is now moved to the left.

The furnace may be worked with two or more electrodes fed with either direct current or alternating current, one, two or three-phase. The arc may either play freely between the electrodes or the magnetic field may throw the arc down toward the layer h of material on the movable table.

The reduction, charging and slagging chambers may be placed alternately either in several rows in succession or in a closed circuit the table then being moved correspondingly.

What I claim is:

1. The process of extracting zinc and other volatile metals from their ores comprising introducing the charge in the shape of an approximately horizontal layer into an electric radiation furnace, heating the surface of said layer by means of radiant heat to liberate the volatile constituents of the charge, principally in said surface, conducting the volatile constituents through a separate outlet into a condenser and removing the non-volatilized residues of the charge.

2. The process for the continuous production of zinc and other volatile metals from their ores comprising introducing the charge in the shape of an approximately horizontal layer, continuously into an electric radiation furnace, heating the surface of the layer by means of radiant electric heat to liberate the vapors of the volatile metal, principally in said surface, conducting said vapors through a separate outlet into a condenser, and removing the residues of the charge.

3. An electric radiation furnace for the production of zinc and other volatile metals from their ores comprising a furnace chamber the bottom of which is constituted by a movable table, means whereby said table may be charged outside of the furnace chamber on one side of the same, means whereby the residues of the charge may be removed from said table on the other side of the furnace chamber, means for heating the charge by radiant electric heat, while the charge is carried through the furnace chamber by the movable table, and means providing an outlet for the volatile constituents generated in the charge.

4. An electric radiation furnace for extracting zinc and other volatile metals from their ores comprising a furnace chamber whose bottom is constituted by a movable table, said chamber having openings between said table and the lower edges of its side walls which extend transversely to the motion of the table, said openings permitting the charge to enter the furnace chamber on one side, that the residue can leave the chamber on the other side, the lower edge of the furnace wall cutting off the top of the charge and forming the same to a convenient surface as the charge is passing through the opening into the furnace chamber.

5. An electric radiation furnace for extracting zinc and other volatile metals from their ores comprising a furnace chamber, the bottom of which is constituted by a movable table extending beyond the furnace chamber on both sides, the projecting portions of the movable table serving for charging and slagging respectively being surrounded by separate chambers adjacent to the furnace chambers.

6. An electric radiation furnace for production of zinc and other volatile metals from their ores comprising a furnace, the bottom of which is constituted by a movable table, flanges on said table extending outwardly substantially at right angles thereto, and projections carried by the side walls of the furnace within, the said flanges, said projections over-lapping the said flanges whereby the charge may form a tight closure between said flanges and said projection.

In testimony whereof I affix my signature in presence of two witnesses.

FILIP THARALDSEN.

Witnesses:
N. G. VANDBERG,
C. FABRICIUS HANSEN.